July 9, 1940.  A. HENNICKE ET AL  2,207,483
STEREOSCOPIC APPARATUS
Filed Nov. 3, 1938  2 Sheets-Sheet 1
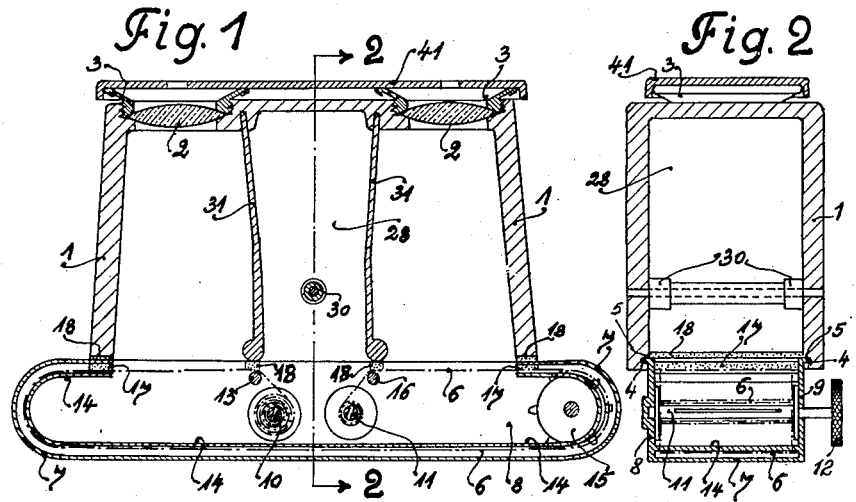
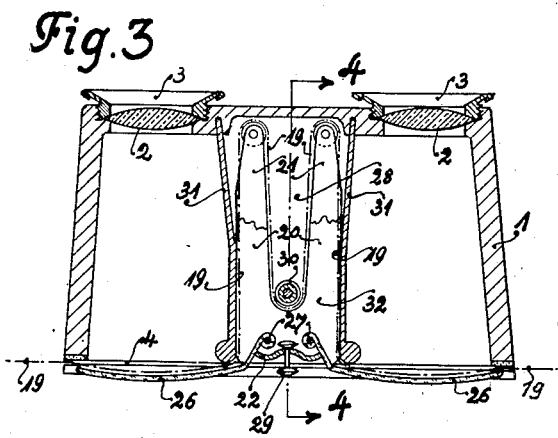 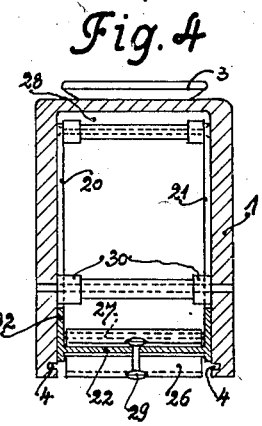
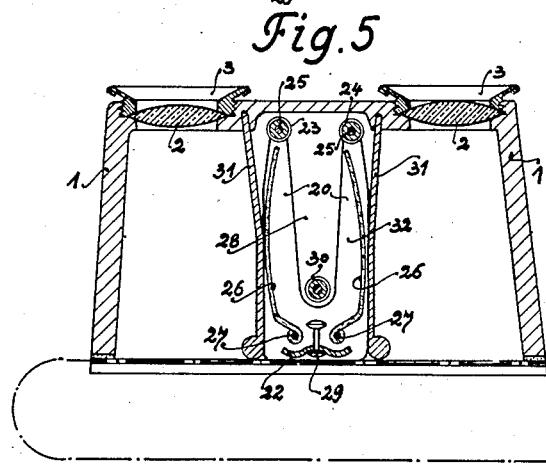 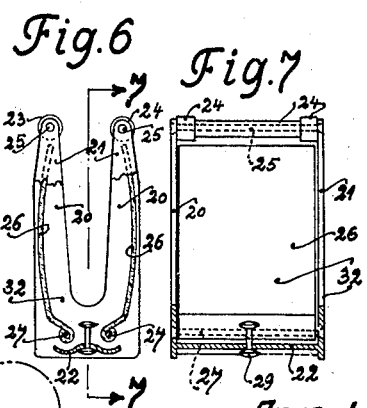
Inventors,
Alfred Hennicke
Hugo Bassel July 9, 1940.  A. HENNICKE ET AL  2,207,483
STEREOSCOPIC APPARATUS
Filed Nov. 3, 1938  2 Sheets-Sheet 2
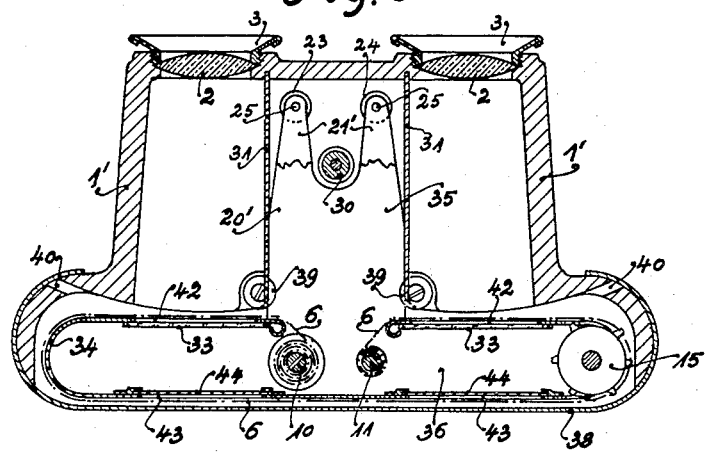
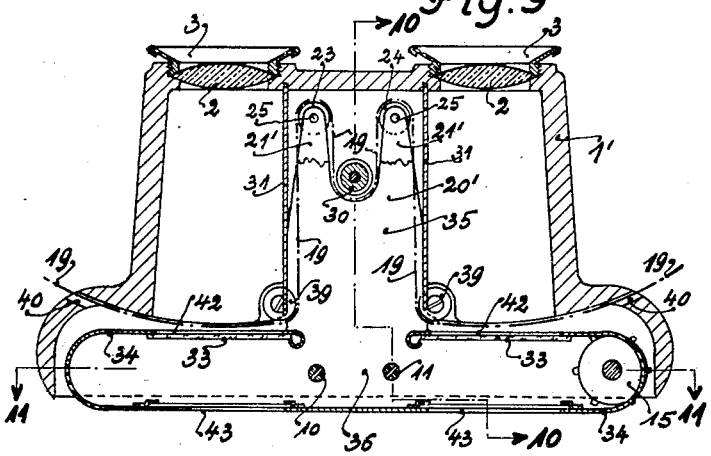
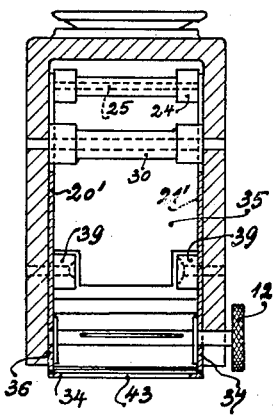
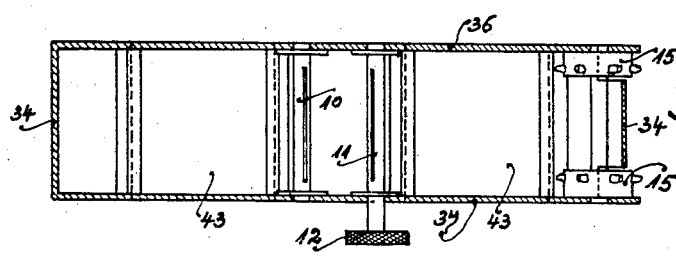
Inventors,
Alfred Hennicke
Hugo Bossel Patented July 9, 1940

2,207,483

UNITED STATES PATENT OFFICE 2,207,483

STEREOSCOPIC APPARATUS

Alfred Hennicke and Hugo Bossel, Hamburg-Altona, Germany

Application November 3, 1938, Serial No. 238,644
In Germany February 10, 1938

5 Claims. (Cl. 88—31)

This invention relates to a stereoscopic apparatus adapted to serve as stereoscopic camera and stereoscope.

Compared with the known stereoscopic cameras, in which the body contains stationary film winding and unwinding rolls and stationary guide rolls by means of which the film is moved past the lenses, the apparatus according to the invention is provided with a receptacle detachably connected with the body and containing the winding and unwinding rolls as well as the deviation and guiding elements for the film, and the receptacle possesses also removable means for guiding the film to be viewed.

This construction according to the invention makes it possible to use the camera as stereoscope without the least trouble. When pictures are to be taken with the apparatus, the film guiding means for viewing pictures may remain in the body during the photographic operations.

Furthermore, in an apparatus according to the invention the film guiding means for photographic work and the film guiding means for viewing pictures may form a unitary structure to reduce the number of loose parts to a minimum.

Two embodiments of the invention are illustrated by way of example in the accompanying drawings, Figures 1 to 7 covering one embodiment and Figs. 9 to 11 the other one.

In the drawings,

Figure 1 is a longitudinal section of the apparatus according to the invention when used as camera, which is provided with an insertable receptacle for the film;

Fig. 2 is a section on the line 2—2 of Fig. 1;

Fig. 3 is a longitudinal section of the apparatus provided with a frame for guiding a film to be viewed;

Fig. 4 is a section on the line 4—4 of Fig. 3;

Fig. 5 is a sectional view similar to that shown in Fig. 3, in which, however, the guiding frame for viewing a film is in inoperative position and the receptacle for the taking film is indicated by dots and dashes;

Fig. 6 is a partial sectional detail view of the guiding frame for viewing a film, without the apparatus;

Fig. 7 is a section on the line 7—7 of Fig. 6;

Fig. 8 is a longitudinal section of a modified form of the apparatus, in which the receptacle with guiding means for the taking film and the guiding frame for viewing a film form a unit, with the film ready for taking pictures;

Fig. 9 is a similar view as Fig. 8, but with the film ready for viewing;

Fig. 10 is a section on the line 10—10 of Fig. 9; and

Fig. 11 is a section on the line 11—11 of Fig. 9.

The stereoscopic apparatus comprises a body 1 provided with lenses 2 and eye cups 3. As shown in Figs. 1 to 4, the body 1 is provided with grooves 4 for the reception of the edges 5 of a receptacle 7 containing an unexposed film 6. The receptacle 7 for the film 6 comprises two longitudinal walls 8, 9 in which a spool 10 for holding unexposed film and a take-up spool 11 are rotatably arranged. The shaft of the spool 11 passes through the wall 9 and is provided at its end with a knob 12.

The unexposed film 6 coming from the spool 10 is moved past one of the lenses 2 by means of a deviating member 13 and then passes over a wall 14 serving as its guide. The wall 14 is penetrated by the teeth of a sprocket or transport roll 15 rotatably disposed in the longitudinal walls 8, 9 and engaging with its teeth the perforations of the film 6.

From the transport roll 15 the film 6 is led across the other lens 2 and is guided by means of a deviating member 16 to the take-up spool 11. Between the wall 14 and the receptacle 7 a seal 17 made of felt or other suitable material may be provided, and the lower surface of the body 1 may also be protected against the passage of light by seals 18.

From the foregoing, it is apparent that the frames of unexposed film before the lens 2 are separated by the distance around the receptacle wall 14 and that successive frames may be exposed until the first frame exposed before the left hand lens 2 has been reeled around the wall 14 to a point adjacent the space behind the right hand lens 2. Thus, each frame of each simultaneously exposed pair of frames is separated from its fellow by the distance around the wall 14, but that the successive frames exposed by each lens 2 follow each other in order and without spacing. To view a film prepared from such an exposed film, it is necessary the spacing between each frame of each simultaneously exposed pair of frames be preserved. With this in view, our particular viewing film support has been formed.

The guiding member for the film 19 to be viewed comprises two side members 20, 21 rigidly united by a cross-piece 22 to form a frame 32. In the side members 20, 21 guide rollers 23, 24 are rotatably placed on shafts 25 by means of which the members 20, 21 are rigidly connected.

Between the side members 20, 21 flaps 26 are movably positioned on shafts 27 and limited in their downward movement by the cross-piece 22. The flaps 26 are made of light dispersing material. The frame 32 for guiding a film to be viewed is loosely inserted in a hollow space 28 formed by partitions 31 in the body 1 and can be easily withdrawn by means of a handle 29 to bring the flaps 26 out of the position shown in Fig. 5 and into the position shown in Fig. 3, and vice versa.

The handle 29 comprises a pin having knobs at its ends and being displaceably arranged in the member 22 so as not to be in the way when the receptacle 7 is inserted.

The hollow space 28 formed in the body 1 contains also a guide roll 30 for the film 19 to be viewed.

It is to be noted that the distance from the space behind the left hand lens 2, up over roll 25, down over roll 30, up over roll 24 and down to the space behind the right hand lens 2 is equal to the distance around the wall 14 of the receptacle 7 so that a corresponding frame of a pair of frames is always behind each lens 2 in viewing.

When the film 19 is to be viewed, the guiding frame 32 is drawn out of the space 28 by means of the handle 29. The film 19 is then placed over the under-surface of the body 1, whereupon the flaps 26 are brought into the position shown in Fig. 3 and the frame 32 is inserted from below in the body 1, so that the film 19 engaged by guide rollers 23, 24 and 30 occupies the position shown in Fig. 3.

The film 19 is adjusted relative to the lenses 2 simply by pulling one or the other end thereof which projects from the body 1.

In the construction shown in Figs. 8 to 11 the receptacle 34 for guiding the taking film 6 and the guide 35 for the film 19 to be viewed are combined to form a unit.

In this instance, the light dispersing members 44 are disposed on the receptacle 34 for guiding the film 6, and the side members 20', 21' of the guiding frame 35 for the film 19 to be viewed are rigidly connected with the side walls 36, 37 of the receptacle 34 for the unexposed film 6 or are integral therewith.

In this construction the guiding frame 35 for the film 19 to be viewed, together with the receptacle 34 for the unexposed film 6, is inserted from below in the body 1' and made light-tight by a cover 38 which can be put on from the side. The body 1' is provided with rolls 39 for guiding the film 19 to be viewed which is moved in a curve in front of and past the lenses 2 and through slots 40 in the body 1'. Guiding in a curve is necessary to bring out marginal sharpness of the picture during viewing.

As in the first form of the invention, the distance around the receptacle 34 is equal to the distance around the guide rollers so that a proper spacing of corresponding frames is maintained.

During the taking of a picture marginal sharpness is produced by arranging a diaphragm 41 indicated in Figs. 1 and 2, in front of the lenses 2.

The receptacle 34 possesses the openings 42, 43, Fig. 9, for viewing, which are covered during photographic work by light-tight slides 33 to prevent the light entering through the lenses 2 from passing to the film portion that is to be protected against light.

We claim:

1. A combined stereoscopic camera and viewer, comprising a hollow body, a pair of lenses adapted for both photographing and viewing carried by said body, said body including a pair of combined film exposing and film viewing zones each in spaced relation to a lens, a receptacle detachably connected to said body and including means for winding and guiding an unexposed film strip across said zones for successively exposing a plurality of simultaneously exposed pairs of frames of said strip with each frame exposed by one lens lying adjacent the previously exposed frame by said lens and separated from the corresponding frame simultaneously exposed by the other lens by a uniform number of frames, guide means carried by said body for a positive counterpart of said strip, said last named guide means including means for simultaneously positioning a pair of complementary frames in said viewing zones, and said viewing guide means being insertable in said body after the removal of said receptacle.

2. A combined stereoscopic camera and viewer, comprising a hollow body, a pair of lenses adapted for both photographing and viewing carried by said body, said body including a pair of combined film exposing and film viewing zones each in spaced relation to a lens, a receptacle detachably connected to said body and including means for winding and guiding an unexposed film strip across said zones for successively exposing a plurality of simultaneously exposed pairs of frames of said strip with each frame exposed by one lens lying adjacent the previously exposed frame by said lens and separated from the corresponding frame simultaneously exposed by the other lens by a uniform number of frames, guide means carried by said body for a positive counterpart of said strip, said last named guide means including means for simultaneously positioning a pair of complementary frames in said viewing zones, and said receptacle and said viewing guide comprising a connected unit.

3. A combined stereoscopic camera and viewer, comprising a hollow body, a pair of lenses adapted for both photographing and viewing carried by said body, said body including a pair of combined film exposing and film viewing zones each in spaced relation to a lens, a receptacle detachably connected to said body and including means for winding and guiding an unexposed film strip across said zones for successively exposing a plurality of simultaneously exposed pairs of frames of said strip with each frame exposed by one lens lying adjacent the previously exposed frame by said lens and separated from the corresponding frame simultaneously exposed by the other lens by a uniform number of frames, guide means carried by said body for a positive counterpart of said strip, said last named guide means including means for simultaneously positioning a pair of complementary frames in said viewing zones, said receptacle and said viewing guide comprising a connected unit, translucent areas in said receptacle behind said zones, slots through said receptacle for said counterpart strip, and a removable cover for said slots and translucent areas.

4. A combined stereoscopic camera and viewer, comprising a hollow body, a pair of lenses adapted for both photographing and viewing carried by said body, said body including a pair of combined film exposing and film viewing zones each in spaced relation to a lens, a receptacle detachably connected to said body and including means for winding and guiding an unexposed film strip across said zones for successively exposing a plurality of simultaneously exposed pairs of frames of said strip with each frame exposed by one lens lying adjacent the previously exposed frame by said lens and separated from the corresponding frame simultaneously exposed by the other lens by a uniform number of frames, guide means carried by said body for a positive counterpart of said strip, said last named guide means including means for simultaneously positioning a pair of complementary frames in said viewing zones, said receptacle and said viewing guide comprising a connected unit, translucent areas in said receptacle behind said zones, slots through said receptacle for said counterpart strip, a removable cover for said slots and translucent areas, said receptacle including a wall between said areas and zones, openings in said wall in alinement with said areas and zones, and light tight slides normally closing said openings.

5. A combined stereoscopic camera and viewer, comprising a hollow body, a pair of lenses adapted for both photographing and viewing carried by said body, said body including a pair of combined film exposing and film viewing zones each in spaced relation to a lens, a receptacle detachably connected to said body and including means for winding and guiding an unexposed film strip across said zones for successively exposing a plurality of simultaneously exposed pairs of frames of said strip with each frame exposed by one lens lying adjacent the previously exposed frame by said lens and separated from the corresponding frame simultaneously exposed by the other lens by a uniform number of frames, guide means carried by said body for a positive counterpart of said strip, said last named guide means including means for simultaneously positioning a pair of complementary frames in said viewing zones, and means for holding said counterpart in said viewing zones, said means curving said counterpart in arcs substantially concentric to the curvature of said lenses.

ALFRED HENNICKE.
HUGO BOSSEL.